United States Patent
Shreeve et al.

(10) Patent No.: US 7,535,619 B2
(45) Date of Patent: May 19, 2009

(54) DISCHARGE OF MEM DEVICES HAVING CHARGE INDUCED VIA FOCUSED BEAM TO ENTER DIFFERENT STATES

(75) Inventors: Robert W. Shreeve, Corvallis, OR (US); George Z. Radominski, Corvallis, OR (US); Timothy R. Emery, Corvallis, OR (US); Alexander Govyadinov, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 100 days.

(21) Appl. No.: 11/831,797

(22) Filed: Jul. 31, 2007

(65) Prior Publication Data
US 2007/0268554 A1    Nov. 22, 2007

Related U.S. Application Data

(62) Division of application No. 11/115,790, filed on Apr. 27, 2005, now Pat. No. 7,268,933.

(51) Int. Cl.
*G02B 26/00*    (2006.01)
*H04N 5/74*    (2006.01)

(52) U.S. Cl. .................. 359/290; 359/293; 348/771

(58) Field of Classification Search ............... 359/198, 359/214, 224, 225, 290–293, 298; 348/771, 348/772
See application file for complete search history.

(56) References Cited

U.S. PATENT DOCUMENTS

| | | | |
|---|---|---|---|
| 2,681,423 A | 6/1954 | Auphan | |
| 2,682,020 A | 6/1954 | Johnson | |
| 2,733,501 A | 2/1956 | Orthuber et al. | |
| 3,667,830 A | 6/1972 | Rottmiller | |
| 3,746,911 A | 7/1973 | Nathanson et al. | |
| 3,886,310 A | 5/1975 | Goldberg et al. | |
| 5,216,537 A | 6/1993 | Hornbeck | |
| 5,287,215 A | 2/1994 | Warde et al. | |
| 5,822,110 A | 10/1998 | Dabbaj | |
| 5,926,309 A | 7/1999 | Little | |
| 6,028,696 A | 2/2000 | Robinson et al. | |
| 6,130,770 A | 10/2000 | Bloom | |
| 6,943,933 B2 | 9/2005 | Radominski et al. | |
| 7,019,887 B1* | 3/2006 | Guo et al. | ................ 359/290 |
| 2003/0219196 A1 | 11/2003 | Weng et al. | |
| 2004/0239894 A1 | 12/2004 | Shimada | |
| 2005/0110419 A1 | 5/2005 | Witmer | |

* cited by examiner

*Primary Examiner*—William C Choi

(57) ABSTRACT

An apparatus includes micro-electromechanical (MEM) devices, a charge source, and a discharge mechanism. Each MEM device has different states based on a charged induced thereon. The charge source is to induce the charge thereon such that the MEM devices each enter one of the different states thereof. The discharge mechanism for the MEM devices is to discharge the induced thereon. The discharge mechanism includes one of a resistor for each MEM device and an ultraviolet (UV) light source. The resistor is to discharge the charge on its MEM device to ground. The UV light source is to emit photons onto the MEM devices, such that the photons discharge the charge on the MEM devices via photoelectric effect.

23 Claims, 14 Drawing Sheets

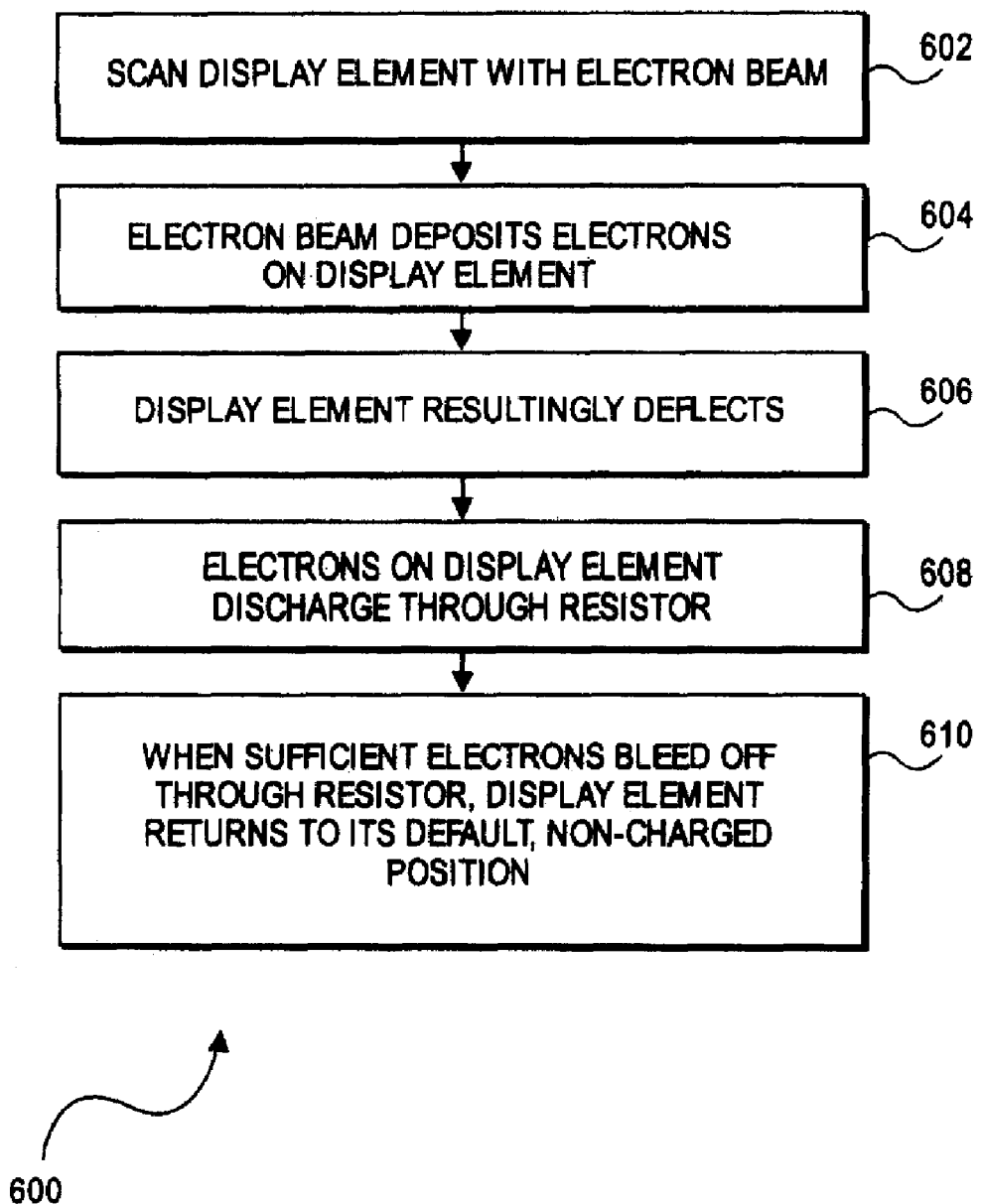

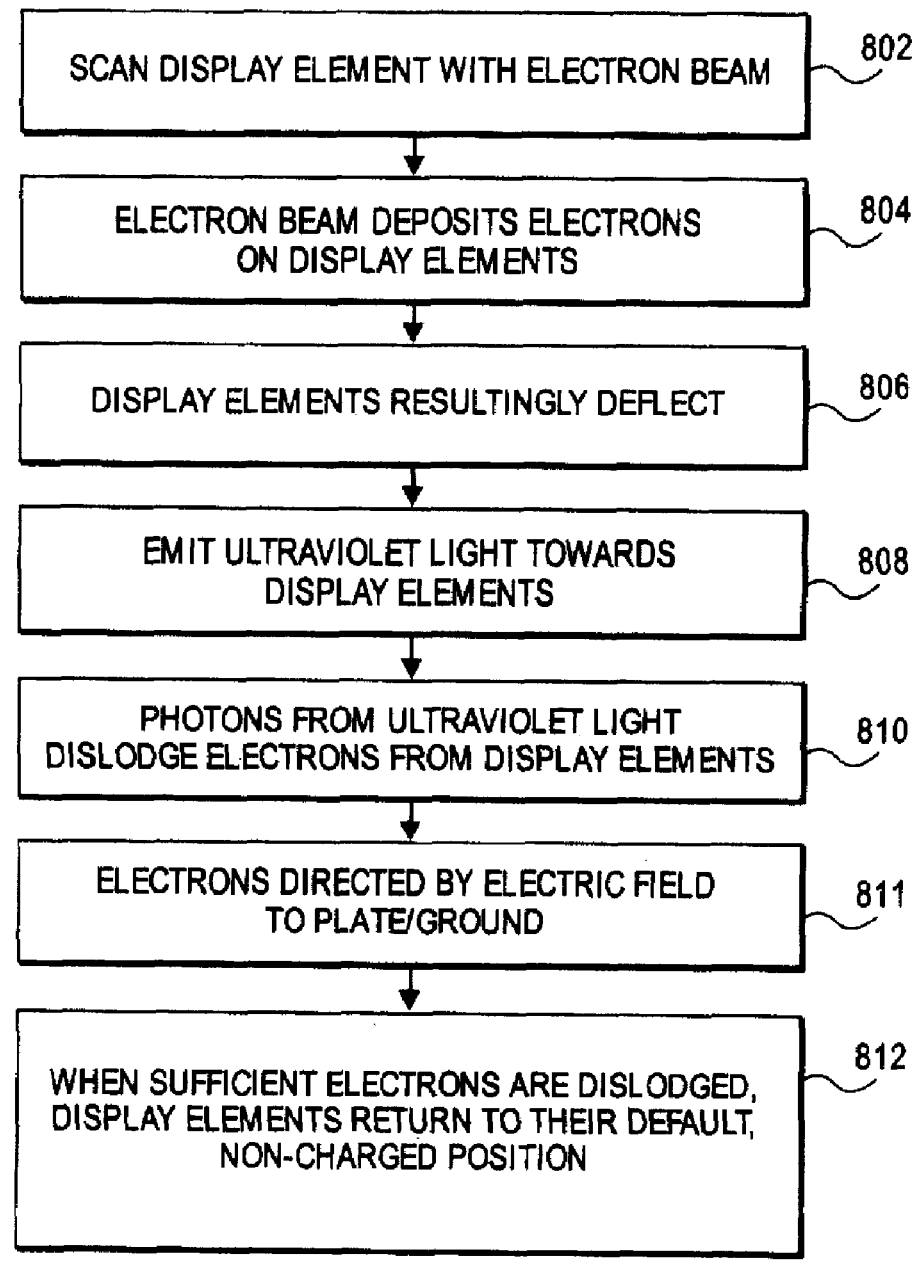

DISCHARGE OF MEM DEVICES HAVING CHARGE INDUCED VIA FOCUSED BEAM TO ENTER DIFFERENT STATES

This application is a divisional of Ser. No. 11/115,790, filed Apr. 27, 2005, now U.S. Pat. No. 7,268,933 which is hereby incorporated by reference.

RELATED APPLICATIONS

The present patent application is a continuation-in-part of the previously filed patent application entitled "MEM devices having charge induced via focused beam to enter different states," filed on Dec. 21, 2003, and assigned Ser. No. 10/743,603.

BACKGROUND OF THE INVENTION

Projection-type display devices are generally devices that integrate light sources, optics systems, electronics, and other components for projecting data such as images, video, documents, and spreadsheets from computers or video devices onto walls or front or rear screens, for large-image viewing. They are especially popular among business users who give presentations as part of their job responsibilities. Newer projectors can weigh as little as a few pounds, making them well suited for business travelers. As the quality of projection technology has improved, projectors are also finding their way into peoples' homes for high-definition television (HDTV) and other home entertainment applications. Some industry pundits predict that digital projectors will also become the standard projection technology used in movie theaters.

Some projection-type display devices rely on digital micromirror devices (DMD's). Each DMD may correspond to a pixel or a sub-pixel of the display device. A DMD works by reflecting light in accordance with its corresponding pixel or sub-pixel, so that the pixel or sub-pixel is properly projected by the display device. However, DMD's usually need to be refreshed at very fast rates in order for the resulting display device to work properly. This can induce significant stress on the DMD's, causing them to prematurely fail.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

FIG. 6 is a flowchart of a method of how a resistive element can discharge a display element, according to an embodiment of the invention.

FIG. 8 is a flowchart of a method for discharging the display elements of a display device via photoelectric effect using UV light, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Projection-Type Display Device

Figure 1:
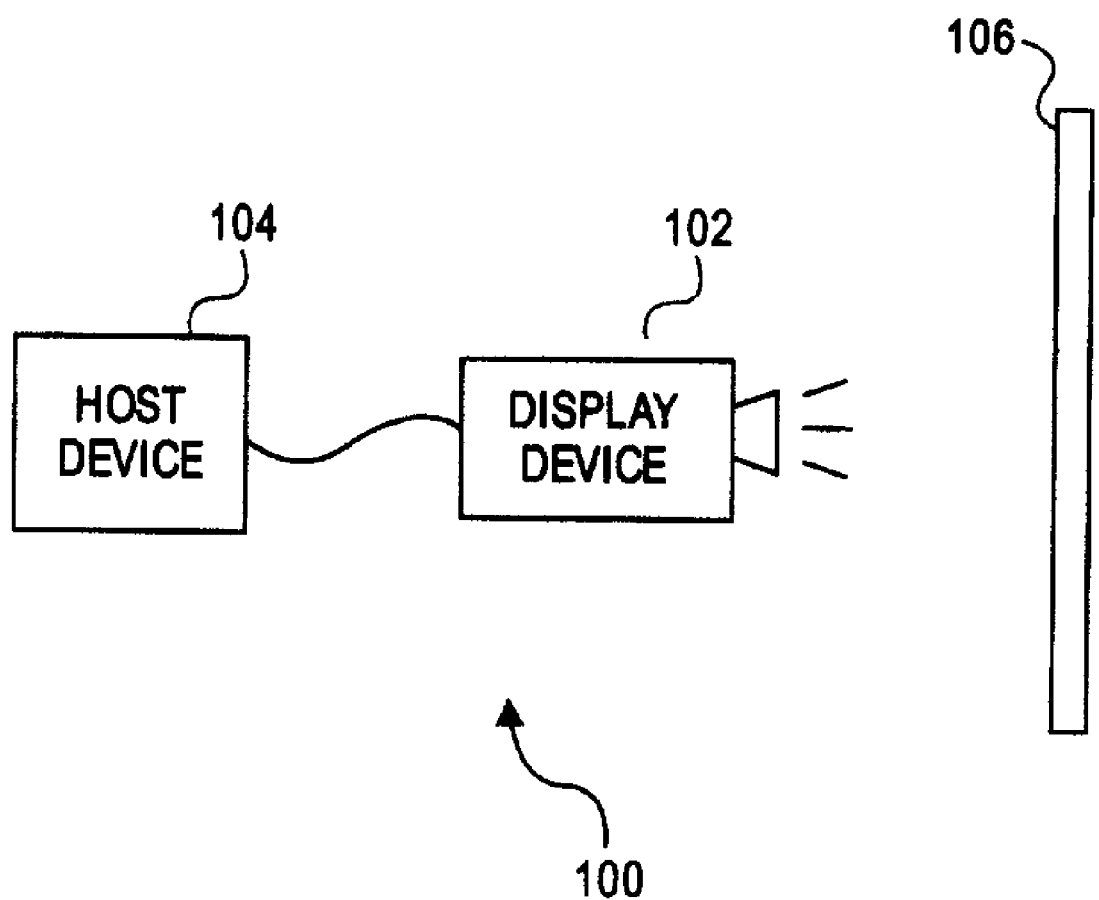
FIG. 1 is a diagram of a rudimentary system, according to an embodiment of the invention.

FIG. 1 shows a rudimentary system 100, according to an embodiment of the invention. The system 100 includes a projection-type display device 102, a host device 104, and a screen 106. The display device 102 receives display information from the host device 104. The display information may include grayscale or color values for each of a number of pixels to be displayed. For instance, in one embodiment, the display information may include intensity values for a red sub-pixel, a green sub-pixel, and a blue sub-pixel, for each pixel to be displayed. The host device 104 may be a laptop or a desktop computing device, or another type of device that is capable of supplying display information to the display device 102. The display device 102 projects images onto the screen 106 in accordance with the display information received from the host device 104. The screen 106 may alternatively be a different type of background against which images may be projected, such as a wall of a room, a whiteboard, and so on.

Figure 2A:
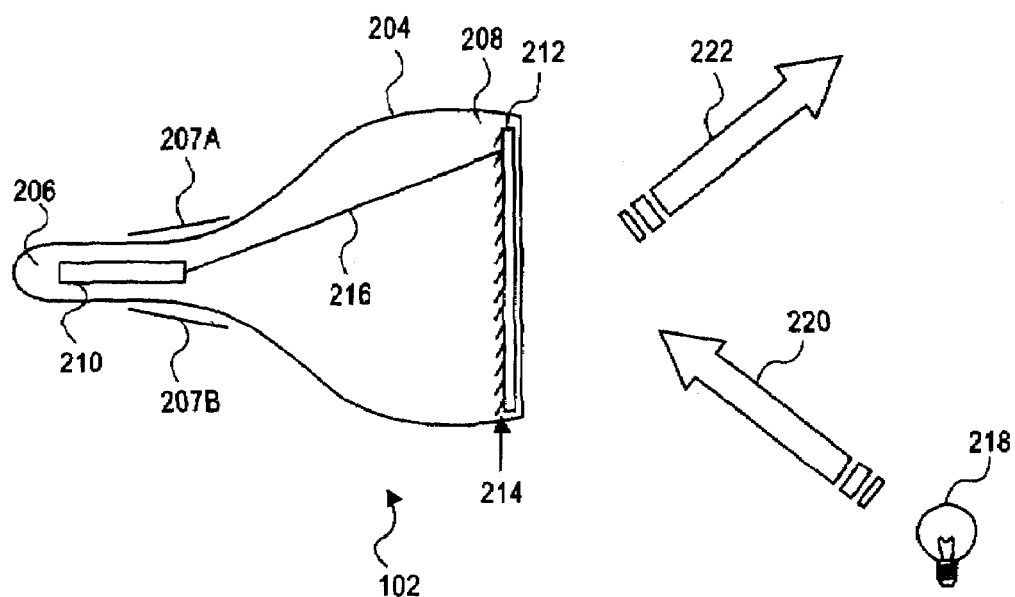
FIGS. 2A and 2B are diagrams of projection-type display devices, according to varying embodiments of the invention.

FIG. 2A shows the projection-type display device 102, according to an embodiment of the invention. The display device 102 includes a cathode-ray tube 204, a focused electron beam source 210, a plate 212, display elements 214, and one or more light sources 218. The cathode-ray tube 204 is a vacuum tube having a tapered end 206 and a wide end 208. The focused electron beam source 210 is situated at the tapered end 206, whereas the plate 212 is situated at the wide end 208. The display elements 214 are disposed against the plate 212, facing the focused beam source 210. One side of the plate 212 thus faces the focused beam source 210, whereas another side of the plate 212 faces outward therefrom.

The focused electron beam source 210 is more generally a focused beam source that may generate a beam other than an electron beam. The focused beam is a charge-creating beam. Most generally, the focused beam source 210 is a charge source. The focused electron beam source 210 generates a focused electron beam 216, that is individually scanned over the display elements 214, in accordance with display information received from the host device 104 of FIG. 1. As is described in more detail later in the detailed description, the focused electron beam 216 causes secondary electrons to be emitted from the display elements 214, by bombarding the display elements 214 with primary electrons. The charges on the display elements 214 interact with the charge on the plate 212 to cause the elements 214 to enter different display states, based on the display information.

The display elements 214 can be micro-electromechanical (MEM) devices. The light sources 218 may be incandescent light bulbs, halide light bulbs, arc lamps (such as mercury or xenon arc lamps), and light-emitting diodes (LED's), or other types of light sources. The light sources 218 project light 220 against the display elements 214, which in one particular embodiment is reflected, but that can also be refracted, and/or transmitted as the light 222, to result in the displayed image on the screen 106 of FIG. 1. The light 220 is projected from outside the cathode-ray tube 204, and is reflected off the display elements 214 as the light 222. The plate 212 may be held at a constant voltage, such as common or ground.

The focused beam 216 is positionable (i.e., scannable) over the display elements 214 due to the presence of deflecting plates 207A and 207B, which are collectively referred to as the deflecting plates 207. The deflecting plates 207 vary in charge over time during a given frame, so that during that frame the focused beam 216 is caused to scan over all of the display elements 214. The plates 207 may be electrostatic or electromagnetic deflecting plates. The number of electrons generated by the focused beam source 210, where the beam source 210 is an electron beam source, may be dependent on the type of filament that is used as the beam source 210. Furthermore, the energy induced by the deflecting plates 207 depends on their position relative to the tube 204.

Figure 2B:
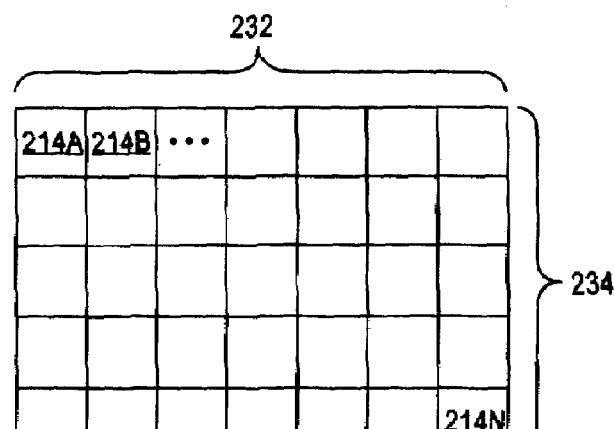

FIG. 2B shows how the light 220 projected from the light sources 218 is reflected, refracted, and/or transmitted off the display elements 214, to result in the light 222, according to one embodiment of the invention. The display elements 214 are specifically depicted as the display elements 214A, 214B, ..., 214N, organized into columns 232 and rows 234. FIG. 2B specifically illustrates the situation where the light 220 projected from the one or more light sources 218 is reflected, refracted, and/or transmitted off all the display elements 214, resulting in the light 222. As such, the light sources 218 may include a single light source projecting the light 220 that is white light. In this embodiment, each of the display elements 214 may correspond to one pixel of the display information.

Furthermore, the focused electron beam 216 is able to individually scan the display elements 214, such that each of the display elements 214 may be individually bombarded with a different number of electrons by the focused beam 216. For instance, the display elements 214 of the first row of the rows 234 are individually scanned from the left column of the columns 232 to the right column of the columns 232, then the elements 214 of the second row of the rows 234 are individually scanned from the left column of the columns 232 to the right column of the columns 232, and so on. A frame of the display information may result in the individual scanning of the display elements 214 in this manner one or more times.

The device 102 has been described and shown in FIGS. 1, 2A, and 2B as being a projector-type display device, in which the display elements 214, or MEM devices, are controlled in accordance with image data, and light 220 is projected onto the display elements 214 for reflection thereby, as the light 222. However, the device 102 may also be used for other display and non-display applications. For instance, the device 102 may be a direct-view-type display device, instead of a projector-type display device.

In its most general embodiment, the device 102 uses its MEM devices to redirect light. Therefore, the device 102 can be used in any application in which the redirection of light is useful, such as in various communication, instrumentation, and light-analysis applications, such that the device 102 may be a communication device, an instrumentation device, a light-analysis device, or most generally a light-redirection device. For instance, fiber optic tubes may be coupled to the MEM devices. Light emitted onto the MEM devices by some of the tubes may then be appropriately redirected into other of the tubes by the MEM devices.

Display Elements

Figure 3:
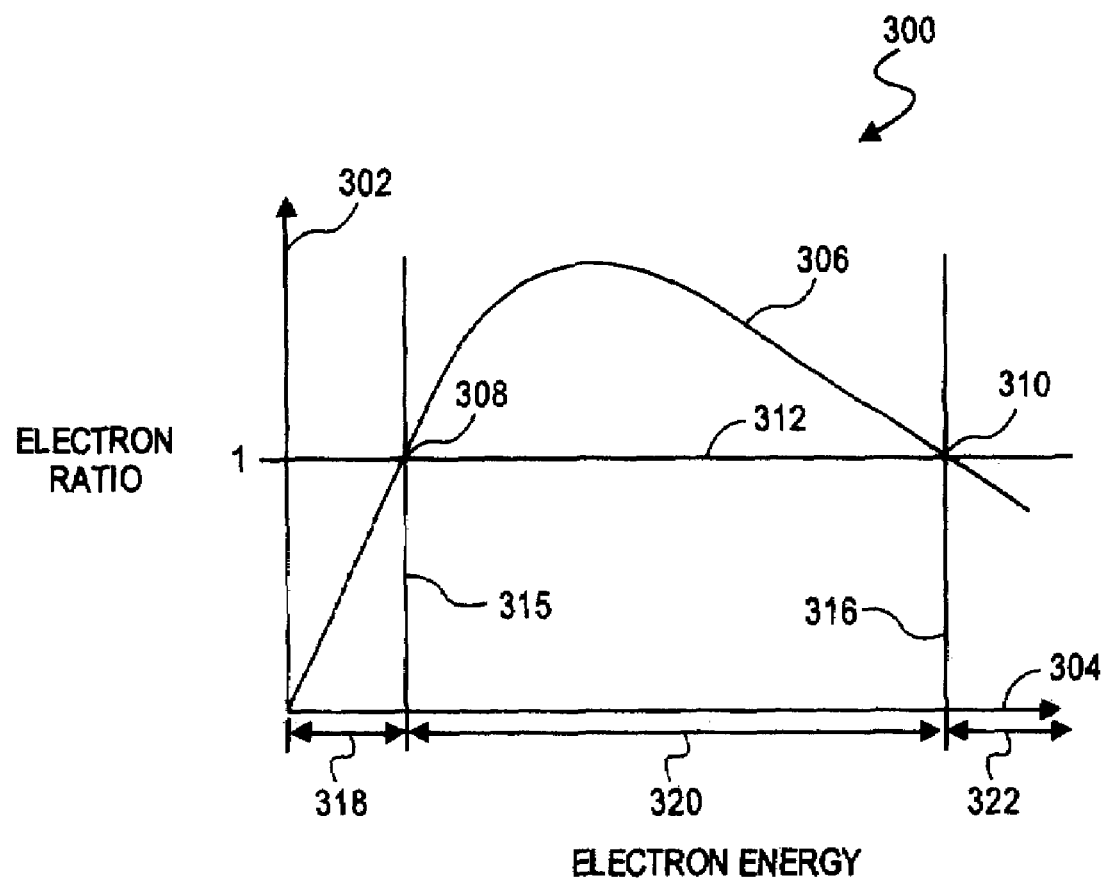
FIG. 3 is a graph depicting the physics by which display elements operate, according to an embodiment of the invention.

FIG. 3 shows a graph 300 that illustrates the physics by which display elements operate, according to an embodiment of the invention. The y-axis 302 is a ratio of the number of electrons leaving the surface of a given display element, which are secondary electrons, divided by the number of electrons bombarding the surface of the display element by an electron beam, which are primary electrons. The x-axis 304 is a measure of the electron energy of the electron beam bombarding the display element. On the y-axis 302, a ratio of one, indicated by the line 312, is when the number of electrons leaving the surface of the display element equals the number of electrons bombarding the surface of the display element.

The line 306 indicates this ratio on the y-axis 302 as the electron energy is increased on the x-axis 304. As the energy increases, the ratio increases within the region 318 demarcated by the y-axis 302 and the vertical line 315. Within the region 318, the display element is charged negative, because the ratio is less than one, corresponding to fewer electrons leaving the display element than electrons bombarding the element. At the point 308, the ratio reaches a value of one, at which the number of electrons leaving the display element is equal to the number of electrons bombarding the element. As the electron energy continues to increase, the ratio increases and then decreases within the region 320 demarcated by the vertical lines 315 and 316. Within the region 320, the display element is charged positive, because the ratio is greater than one, corresponding to more electrons leaving the display element than electrons bombarding the element. At the point 310, the ratio again reaches a value of one, at which the number of electrons leaving the display element is equal to the number of electrons bombarding the element. As the electron energy continues to increase, the ratio decreases within the region 322 demarcated by the vertical line 316. Within the region 322, the display element is again charged negative, because the ratio is less than one. It is noted that the discharge mechanisms that are described later in the patent application, including resistors for the display elements as well as ultraviolet light discharge via photoelectric effect, are operable when the display elements operate within the region 322, such that the display elements are charged negative and subsequently discharged.

The points 308 and 310 are referred to as crossovers, where the point 308 is the first crossover, and the point 310 is the second crossover. The first crossover is within an unstable region, because the surface of the display element tends not to remain charged at a given electrostatic potential at the point 308. By comparison, the second crossover is within a stable region, because the surface of the display element tends to remain charged at the given electrostatic potential at the point 310. Once the display element has entered the region in which the point 310 lies by bombarding electrons from a focused electron beam, a flood electron beam may then be employed to maintain the display element within this region. Thus, by controlling the value of the ratio of electrons leaving the display element to electrons bombarding the element, the display element may be charged either positive or negative, and may be maintained at the point 310. The value of the ratio depends on the composition of the surface of the display element, the surface area of this surface, as well as the energy of the bombarding electrons.

More generally, the display element is charged via the focused beam inducing a charge on the display element. In one embodiment, a negative or a positive charge is induced on the display element, and an opposite mirror charge is induced on the plate against which the display element is disposed. Thus, If a negative charge is induced on the display element, a positive charge is induced on the plate, and vice-versa. As a result, the display element has an attractive force towards the plate. In another embodiment, the same type of charge, positive or negative, is induced on both the display element and the plate. In this embodiment, the display element has a repelling force away from the plate.

In at least some embodiments of the invention, the charge induced on a display element via the focused beam is proportional to the current in the beam integrated over the time that the beam stays incident to the display element. Thus, the longer the beam focuses on a given display element and/or the greater the current in the beam, the greater the charge that is induced on the display element. This allows different display elements to have different charges induced thereon by the focused beam.

Furthermore, other types of charging mechanisms, besides electrons of a focused electron beam, can be used to induce a charge on the display element. In one embodiment, the narrower the focused beam, the smaller the beam spot size is, such that the display elements may be packed more closely together.

Figure 4A:
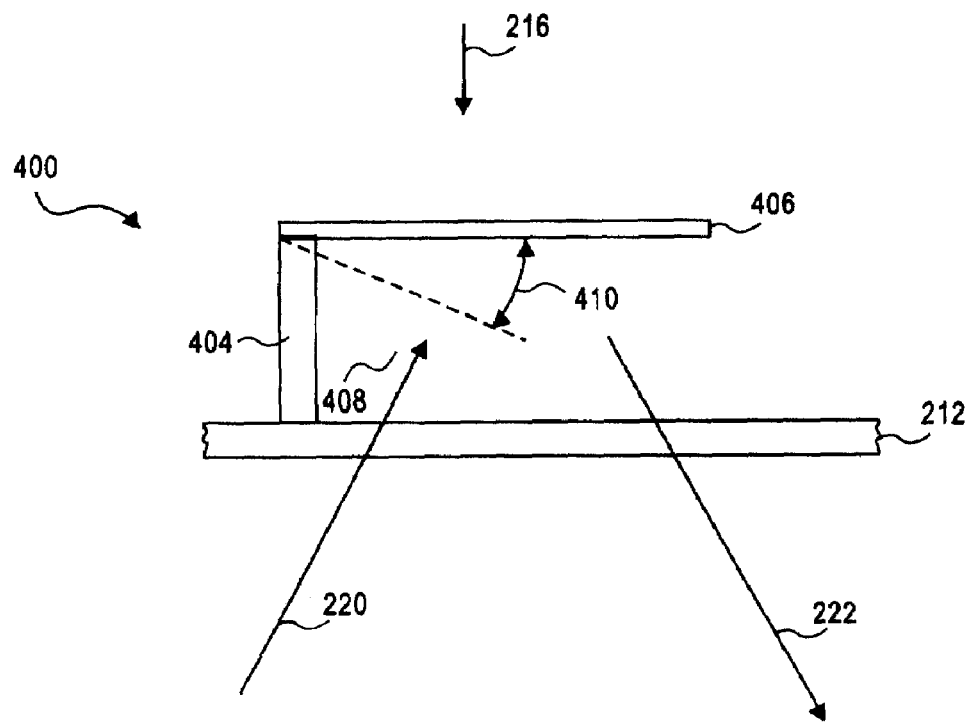
FIG. 4A is a diagram of a display element, according to an embodiment of the invention.

FIG. 4A shows a display element 400, according to an embodiment of the invention. The display element 400 is specifically a hinged mirror-type display element, including a reflective membrane 406 that functions as a hinged mirror. The display element 400 is situated against the plate 212, and includes a support 404 that is at least substantially perpendicular to the plate 212. The reflective membrane 406 may be aluminum, and the support 404 is a conductor, like aluminum or another metal, or a weak conductive, like titanium nitride, or another non-metal. However, where the display element 400 is intended to repel away from the plate 212 (opposite to that which is depicted in FIG. 4A), then the support 404 has to be a very good conductor, with low resistance. Furthermore, in such an embodiment, the plate 212 is specific to each display element 400. That is, there is a portion of the plate 212 for each of the display elements that is electrically isolated from the portions of the plate 212 for the other display elements. The support 404 is mounted between one end of the plate 212 and one end of the reflective membrane 406. The display element 400 may be used to implement each of at least one of the display elements 214 that have been described. As depicted in and described in relation to FIG. 4A, the display element 400 is a micro-electromechanical (MEM) device, in that it is small, and hence micro, moves, and hence mechanical, and is chargeable, and hence electrical.

The focused electron beam 216 bombards the reflective membrane 406 with primary electrons, and thus causes the reflective membrane 406 to emit secondary electrons as has been described in conjunction with the graph 300 of FIG. 3. As a result, the reflective membrane 406 becomes charged positive or negative. Where the plate 212 also has a charge, this means that the reflective membrane 406 is able to rotate from the position at which it is shown in FIG. 4A, to the position 408, and potentially any position in-between, as indicated by the bi-directional arrow 410. At the position 408, and any position between the position at which the membrane 406 is shown in FIG. 4A, as indicated by the arrow 410, the membrane 406 is non-parallel to the plate 212 and non-perpendicular to the support 404. The ultimate charge on the membrane 406 interacts with the charge on the plate 212, such that the membrane 406 is attracted by the plate 212 to cause it to move to one of the positions between the position in which it is shown in FIG. 4A, to the position 408, as indicated by the bi-directional arrow 410.

The reflective membrane 406 is able to reflect the light 220 projected towards it. The amount and/or direction of the light 220 reflected by the membrane 406 as the light 222 depends on the position of the reflective membrane 406 as has been described. Therefore, it is said that the reflective membrane 406 is able to enter one of a number of different display states, depending on the number of secondary electrons that have been emitted thereby resulting from the focused electron beam 216. For instance, the intensity of the light that is emitted along the vector of the light 222 in FIG. 4A may vary based on the position of the reflective membrane 406, and hence the display state of the display element 400. That is, the angle of reflection of the hinged mirror—viz., the reflective membrane 406—is capable of controlling the intensity of the light reflected by the hinged mirror along the vector of the light 222 in FIG. 4A.

In one embodiment, the default, or off, state of the display element 400 is where the reflective membrane 406 is in the position depicted in FIG. 4A, such that the membrane 406 is parallel to the plate 212. The emission of secondary electrons from the reflective membrane 406 therefore causes the membrane 406 to be attractively charged and tilt towards the plate 212, so that the display element 400 enters a different display state. In one embodiment, there may be just two display states, the default, or off, state, and an activated, or on, display state corresponding to the reflective membrane 406 completely tilting towards the plate 212 at the position 408. In another embodiment, there may be more than two display states, the default state, and a number of activated display states, where each of these activated display states corresponds to the reflective membrane 406 tilting towards the plate 212 at a different angle. Each display state corresponds to the display element 400 differently reflecting the projected light 220, to result in a different intensity and/or duration of the light 222 along the vector of the light 222 as indicated in FIG. 4A.

In the embodiment specifically depicted in FIG. 4A, the emission of secondary electrons from the reflective membrane 406 causes the membrane 406 to be attractively charged and tilt towards the plate 212. The membrane 406 is thus attracted to the plate 212 upon emitting secondary electrons. The membrane 406 may switch between just a default position in which it is depicted in FIG. 4A to and from the position 408, such that the display element 400 has two display states. Alternatively, the membrane 406 may be maintained at different positions between the default position and the position 408, such that the display element 400 has more than two display states, such that the activated display states include the display states in which the element 400 partially to fully tilts towards the plate 212.

In addition, the plate 212 is depicted in FIG. 4A, and has been described thus far, as being common to all the display elements, including the display element 400 of FIG. 4A. Alternatively, however, there may be an electronically disconnected plate for each display element, in the embodiment where the membrane 406 is to tilt away from, or repel from, the display element, as opposed to the embodiment where the membrane is to tilt towards, or attract towards, the display element. That is, each display element has a corresponding plate that is not electrically connected to any plate of any other display element.

The embodiment of FIG. 4A has been described such that the position of the membrane 406 where it is parallel to the plate 212 is the default state of the membrane 406. Inducing a charge on the membrane 406 thus causes it to attract towards the plate 212.

Figure 4B:
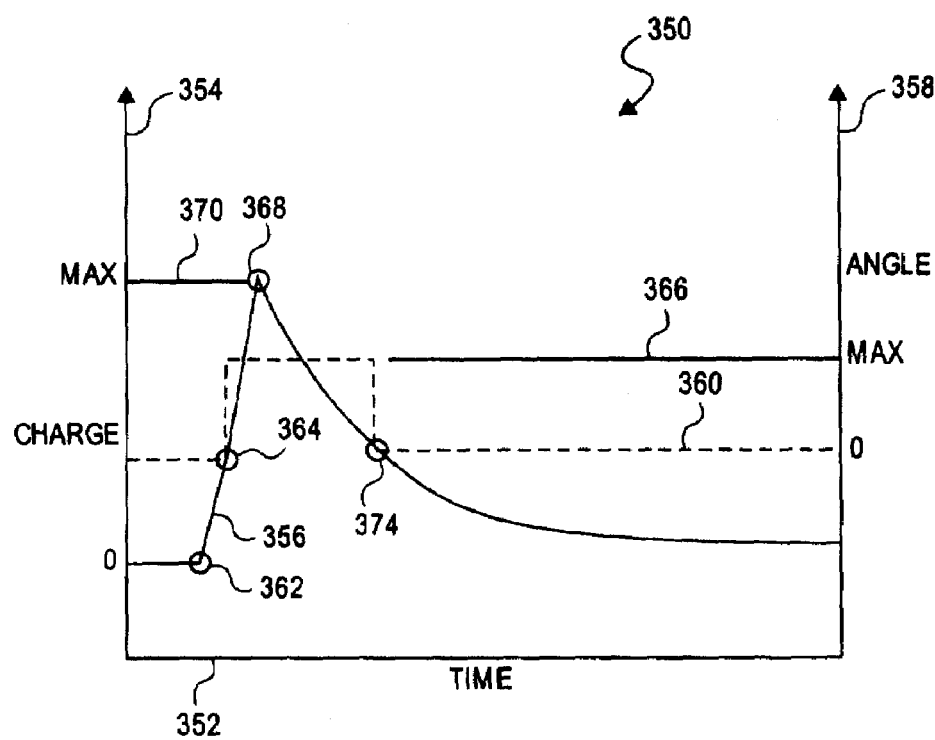
FIG. 4B is a graph of the charge induced on the display element of FIG. 4A and the deflective angle of the element of FIG. 4A as a function of time, according to an embodiment of the invention.

FIG. 4B shows a graph 350 that depicts both the charge induced on the reflective membrane 406 of the display element 400 of FIG. 4A, and the deflective angle of the membrane 406 of the element 400, over time, according to an embodiment of the invention. The x-axis 362 denotes time, whereas the y-axis 354 denotes the charge induced on the membrane 406 as indicated by the line 356, and the y-axis 358 denotes the deflective angle of the membrane 406 as indicated by the line 358. Until the point 362, the charge induced on the membrane 406 is zero, and the deflective angle of the membrane 406 is also zero, corresponding to the default position of the membrane 406, as specifically depicted in FIG. 4A.

Beginning at the point 362, a focused beam is incident to the membrane 406, causing the charge induced on the membrane 406 to increase. It is noted that while charge may be continuously discharged from the membrane 406, via a resistor or via photoelectric effect when using a continuous UV beam, the charge being induced on the membrane 406 is greater than the charge being discharged from the membrane 406. Furthermore, whereas the inducement of the charge is depicted as a linear increase via the line 356, it may be an exponential or another type of non-linear relationship. At the point 364, sufficient charge has been induced on the membrane 406 that the membrane 406 snaps to an activated position, such that the deflective angle of the membrane 406 is at a maximum level 366. This corresponds to the membrane 406 being in the position 408 of FIG. 4A. The maximum amount of charge induced on the membrane 406 occurs at the point 368, corresponding to the level 370, at which point the focused beam is no longer incident to the reflective membrane 406.

At the point 370, once the focused beam is no longer incident to the reflective membrane 406, the charge induced on the reflective membrane 406 immediately begins to be discharged, via a resistor or via photoelectric effect when using a continuous UV beam. This discharge is depicted as an exponentially decreasing curve in FIG. 4B, but may be non-exponentially decreasing in another embodiment. At the point 374, there is insufficient charge to maintain the membrane 406 at its activated position, and the deflective angle of the membrane drops back to zero, corresponding to the level 360, indicating that the membrane 406 has snapped backed to a default position. It is noted that the graph 350 of FIG. 4B specifically depicts the scenario where the display element 400, and thus the reflective membrane 406 thereof, have two states or positions, a default state and an activated state. In other embodiments of the invention, the element 400, and its membrane 406, may have more than two such states or positions, as can be appreciated by those of ordinary skill within the art.

Figure 4C:
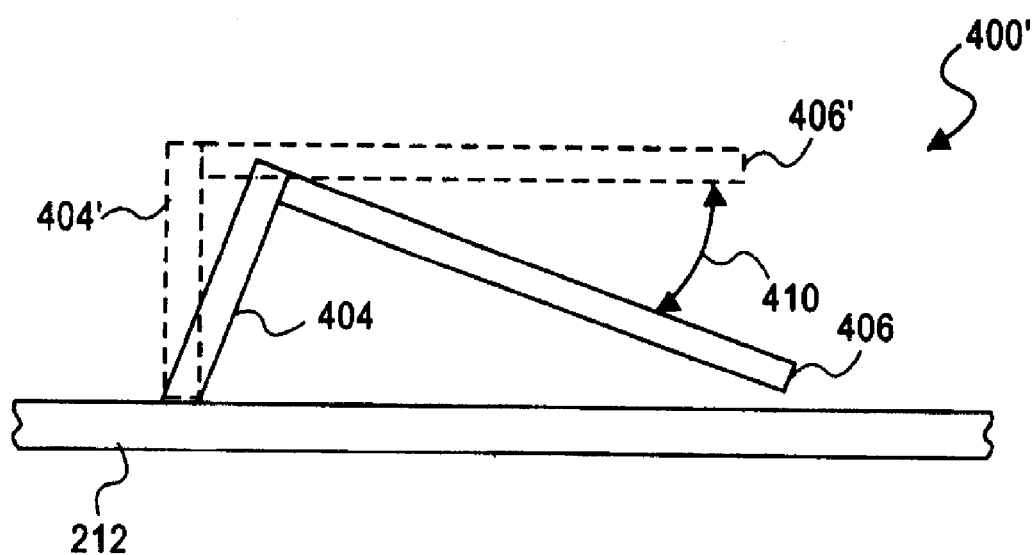
FIG. 4C is a diagram of a display element, according to another embodiment of the invention.

The embodiment of FIG. 4A has been described such that it is the membrane 406 that tilts when a charge is induced on the membrane. Alternatively, the support 404 tilts, instead of the reflective membrane 406. FIG. 4C shows a display element 400', according to an embodiment of the invention in which the support 404 tilts. The reflective membrane 406 substantially remains at a constant angle, such as a right angle, to the support 404, regardless of the charge induced on the membrane 406. Rather, the support 404 tilts in accordance with the charge induced on the membrane 406. In the diagram of FIG. 4C specifically, the support 404 is depicted as having maximally tilted, whereas the default position of the support is indicated as the position 404'. The membrane 406, due to its remaining at a constant angle relative to the support 404, therefore moves between the position in which it is specifically depicted in FIG. 4C, and the default position 406', as indicated by the arrow 410.

Discharge of Display Elements Via Resistors

Figure 5A:
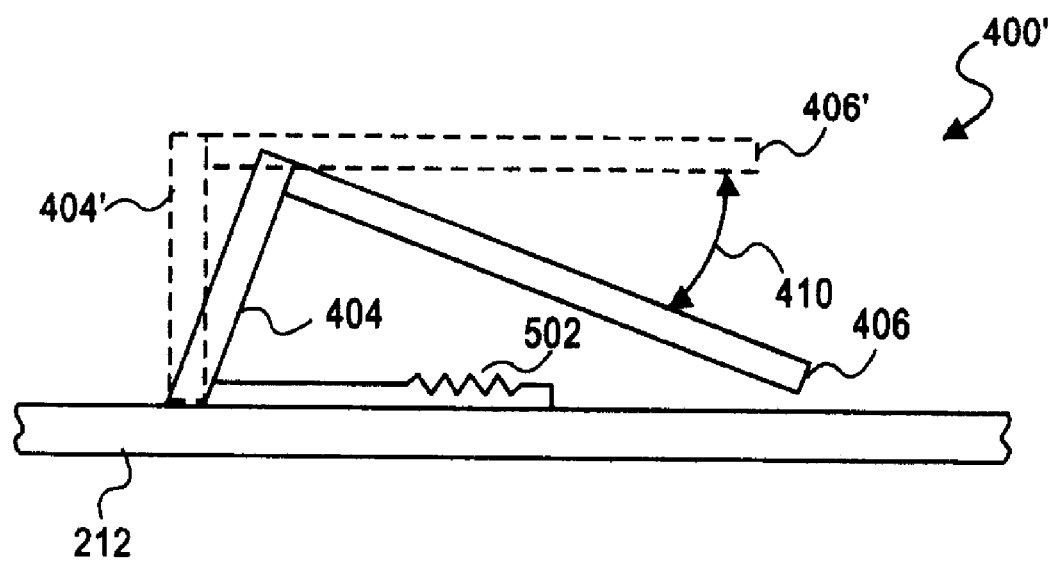
FIG. 5A is a diagram of a display element and how the display element may be discharged with a resistive element, according to an embodiment of the invention.

FIG. 5A shows diagrammatically how the display element 400' of FIG. 4C may be discharged by using a resistor 502, according to an embodiment of the invention. There is a resistor, or more generally, a resistive element or mechanism, for each display element of a display, where the display has a number of display elements. All of the resistors can be generally considered a discharge mechanism. The display element 400 of FIG. 4A may similarly be discharged using a resistor, as can be appreciated by those of ordinary skill within the art, and the particular inclusion of the display element 400' of FIG. 4C in FIG. 5A, instead of the display element 400 of FIG. 4A, is an arbitrary decision made for illustrative convenience. The resistor 502 may be fabricated from polysilicon or another material, and is situated between the plate 212 and the membrane 406 and/or the support 404.

The membrane 406 and the support 404 move to the position in which they are specifically depicted in FIG. 5A, from the default positions 406' and 404', as indicated by the arrow 410, upon a charge being induced upon the membrane 406. The display element 400' thus acts electrically as a capacitor, holding or storing a charge as placed thereon by the emission of secondary electrons resulting from the focused electron beam 216 bombarding the membrane 406 with primary electrons.

The charge is then caused to leak to the chargeable plate 212 via the resistor 502, such that the resistance of the resistor 502 is selected so that the charge completely leaks to the plate 212 by the end of a frame of display information. The plate 212 is considered ground insofar as discharge of the charge on the membrane 406 is concerned. Leakage of the charge from the membrane 406 causes the display element 400' to revert back to the default display state indicated by the position 406'.

In one embodiment, the resistor 502 is passive, and thus immediately starts to leak the charge on the membrane 406 to the chargeable plate 212 as soon as the charge is placed on, or stored by, the membrane 406. The resistor 502 and the plate 212, or just the resistor 502 itself, may act as a discharge, or resistive, path.

Figure 5B:
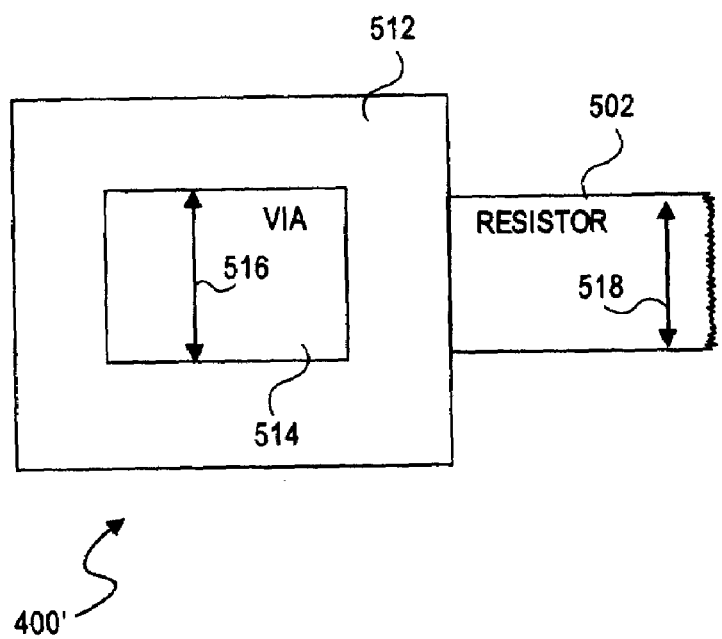
FIG. 5B is a diagram of the top view of the display element of FIG. 5A and depicts design considerations that can be taken into account when constructing the resistive element used to discharge the display element, according to an embodiment of the invention.

FIG. 5B shows a top view of a portion of the display element 400' of FIG. 5A that is used to described design considerations that are to be taken into account when constructing the resistor 502 of FIG. 5A, according to an embodiment of the invention. An enclosure 512 is depicted that defines a via 514. The support 404 of FIG. 5A is inserted into the via 514 and held in place in the via 514 by the enclosure 512. The resistor 502 is constructed to one side of the enclosure 512, and thus to one side of the via 514. Specifically, the resistor 502 may be constructed to the side of the via 514 such that it is located under the membrane 406 of FIG. 5A, or to another side of the via 514 such that it is not located under the membrane 406 of FIG. 5A.

The via 514 has a width 516, and the resistor 502 has a width 518. The widths 516 and 518 are desirably selected so that the ratio of the via width 516 to the resistor width 518 is greater than 1.0. It has been observed that where this ratio is greater than 1.0, the resistance of the resistor 502 does not vary in light of slight variations in the widths 516 and 518 that may be introduced as part of the manufacturing process.

Figure 5C:
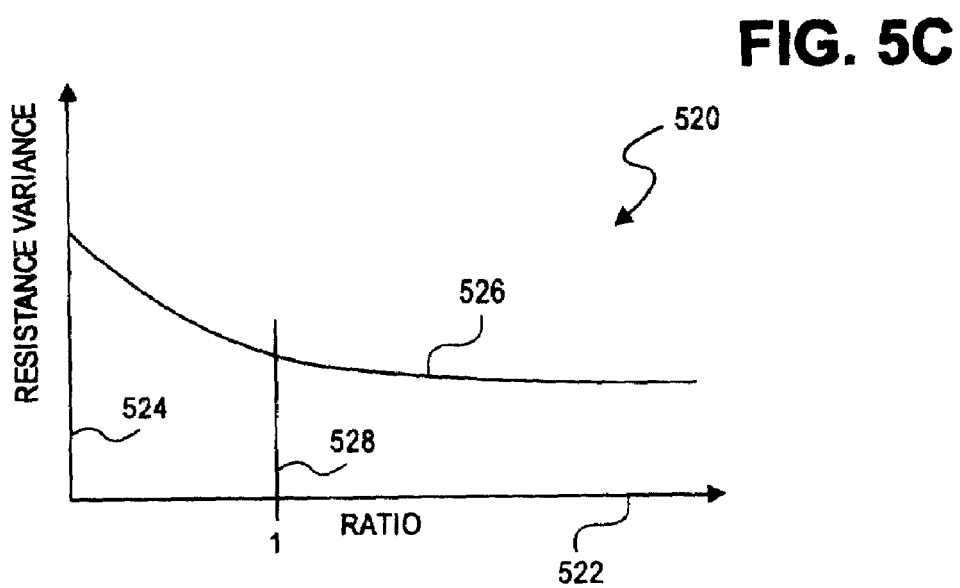
FIG. 5C is a graph showing how resistance variance is stabilized, or minimized, based on the ratio of a via width to a resistive element width, according to an embodiment of the invention.

FIG. 5C specifically depicts a graph 520 that shows how resistance variance is stabilized, or minimized, when the ratio of the via width 516 to the resistor width 518 is greater than 1.0, according to an embodiment of the invention. The x-axis 522 indicates the ratio of the via width 516 to the resistor width 518, while the y-axis 524 denotes variance in the resistance due to slight variations in the widths 516 and 518 that may be introduced during manufacturing. Where the ratio is greater than 1.0, as denoted by the vertical line 528, the resistance variance is minimized and stabilized, as indicated by the line 526.

Figure 5D:
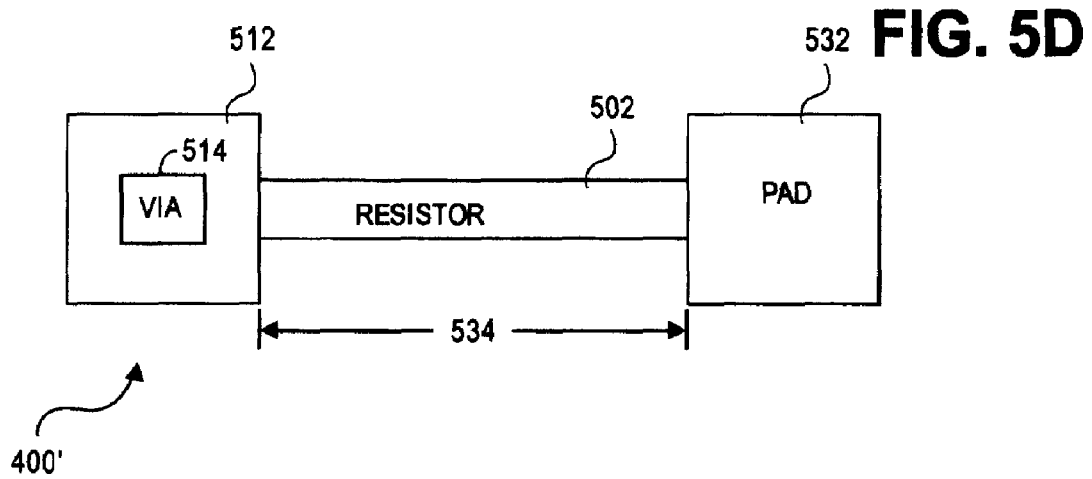
FIG. 5D is a diagram of the top view of the display element of FIG. 5A and depicts further design considerations that can be taken into account when constructing the resistive element used to discharge the display element, according to an embodiment of the invention.

FIG. 5D shows another top view of the display element 400' of FIG. 5A that is used to describe further design consideration to be taken into account when constructing the resistor 502 of FIG. 5A, according to an embodiment of the invention. The resistor 502 is constructed, or fabricated, between the enclosure 512 defining the via 514 for the support 404 of FIG. 5A, and a pad 532. As such, the resistor 502 has a length 534. The length 534 is desirably selected so that is sufficiently large to result in a breakdown voltage of the resistor 502 being greater than the voltage range within which the resistor 502 has to operate. That is, the length 534 is desirably selected so that it is sufficiently large to result in a breakdown voltage of the resistor 502 being greater than the maximum voltage drop over the resistor during normal operation.

In normal operation of the display element 400', there are two relevant voltage drops over the resistor 502. First, there is a voltage drop over the resistor 502 that is sufficient to cause the display element 400' to tilt where it is not currently tilted. That is, there is a voltage on the display element 400' that is sufficient to cause the element 400' to tilt where it is not currently tilted. Second, there is a voltage drop over the resistor 502 that is sufficient to maintain the display element 400' in a tilted position for a desired length of time when it is currently tilted. That is, there is a voltage on the display element 400' that is sufficient to maintain the element 400' in a tilted position for a desired length of time when it is currently tilted. The length 534 of the resistor 502 is thus desirably selected so that it is sufficiently large to result in a breakdown voltage of the resistor 502 being greater than this second voltage drop over the resistor, which is the voltage needed to maintain the display element 400' in a tilted position for a desired length of time when the element 400' is currently tilted.

Figure 5E:
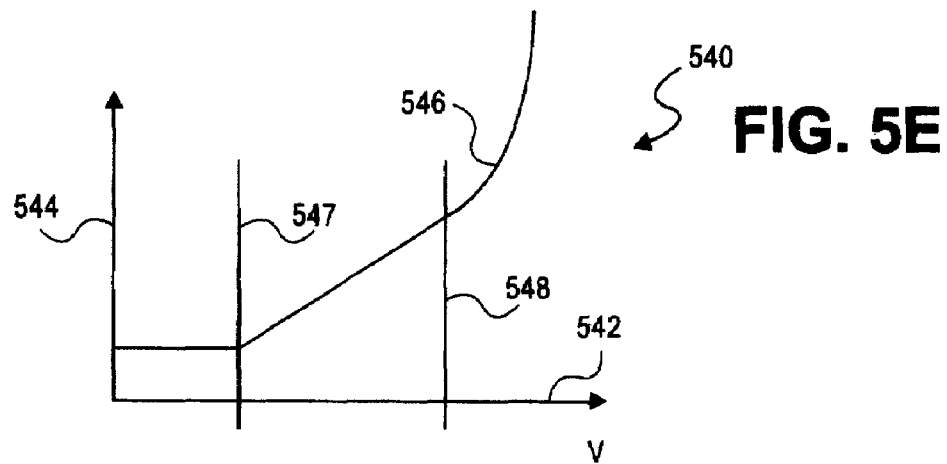
FIG. 5E is a graph depicting how breakdown voltage of the resistive element used to discharge the display element is defined, according to an embodiment of the invention.

FIG. 5E shows a graph 540 illustrating what breakdown voltage is, according to an embodiment of the invention. The voltage over the resistor 502 is indicated on the x-axis 542, and the current through the resistor 502 is indicated on the y-axis 544. The resistor 502 desirably has a constant resistance, which is defined as voltage over current, or the inverse of the slope of the line 546 of the graph 540. As can be seen in FIG. 5E, the resistor 502 has a constant slope just when the voltage thereover is between the voltage levels indicated by the vertical lines 547 and 548. To the left of the vertical line 547, the resistor 502 does not have a constant resistance. Similarly, to the right of the vertical line 548, the resistor 502 does not have a constant resistance.

The voltage level indicated by the vertical line 548 is the breakdown voltage of the resistor 502, and specifically is the voltage at and above which the resistor 502 loses its resistive properties—that is, "breaks down"—and allows too much current to pass through. The voltage level indicated by the vertical line 548 is desirably greater than the top end of the voltage range within which the resistor 502 is designed to operate.

Figure 5F:
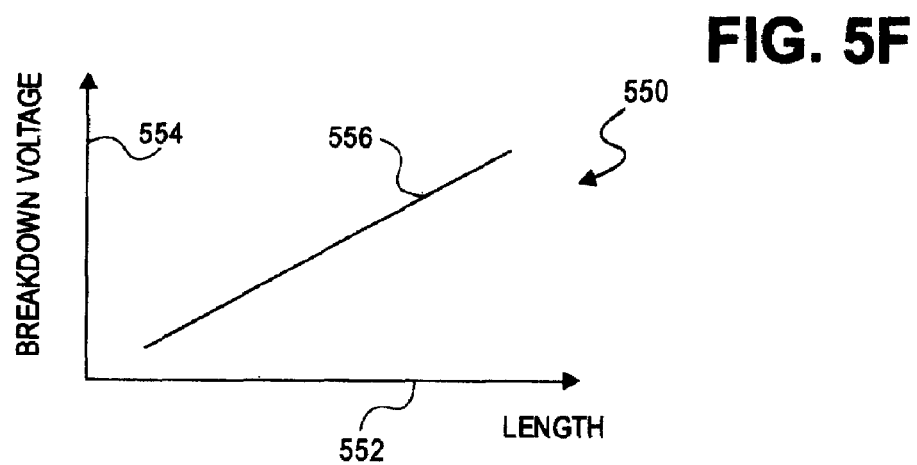
FIG. 5F is a graph depicting the relationship between breakdown voltage and the length of the resistive element used to discharge the display element, according to an embodiment of the invention.

FIG. 5F shows a graph 550 illustrating the relationship between the resistor length 534 of FIG. 5D and the breakdown voltage of the resistor 502, according to an embodiment of the invention. The x-axis 552 denotes the resistor length 534, whereas the y-axis 554 denotes breakdown voltage. As can be seen from the line 556 of the graph 550, the relationship between the resistor length 534 and the breakdown voltage of the resistor 502 is linear, such that the longer the resistor 502, the greater the breakdown voltage thereof. As such, the length 534 of the resistor 502 is desirably selected so that the resulting breakdown voltage is greater than the top end of the voltage range within which the resistor 502 is to operate.

Figure 5G:
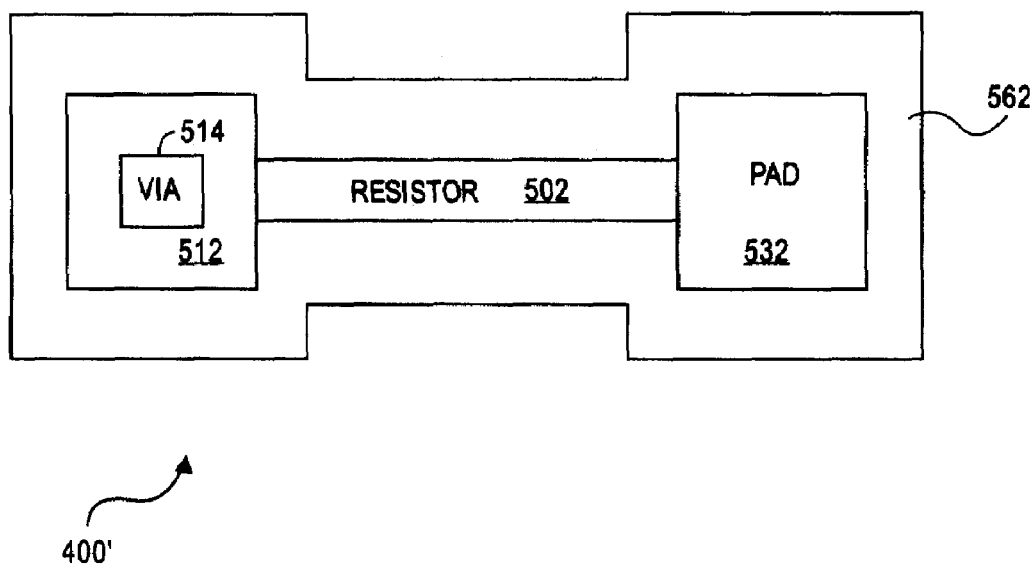
FIG. 5G is a diagram of the top view of the display element of FIG. 5A that depicts an exclusion zone around the resistive element of the display element, according to an embodiment of the invention.

FIG. 5G shows a final top view a portion of the display element 400' of FIG. 5A that shows another component that may be included as part of the display element 400', according to an embodiment of the invention. As before, the display element 400' includes an enclosure 512 defining a via 514 into which the support 404 of FIG. 5A is inserted, and a resistor 502 extending from the enclosure 512 to the pad 532. Furthermore, the display element 400' of FIG. 5G includes an exclusion zone 562. The exclusion zone 562 insulates the resistor 502 and protects the resistor 502 from the plate 212, so that it is not shorted to the plate 212. The exclusion zone 562 is constructed or fabricated from a non-conductive material, such as silicon oxide ($SiO_x$).

FIG. 6 shows a method 600 of how the resistor 502 is able to discharge the charge induced on the display element 400' after the display element 400' has been charged, according to an embodiment of the invention. The display element 400' is scanned with the focused beam source 210 (602), the electron beam 216 depositing electrons on the display element 400' to negatively charge the display element 400' (604). As a result, the display element 400' deflects (606). The electrons begin to discharge through the resistor 502 (608). When a sufficient number of the electrons have bled off through the resistor 502, the display element 400' reverts or returns to its default, non-charged position (610).

Discharge of Display Elements Via Photoelectric Effect

Figure 7:
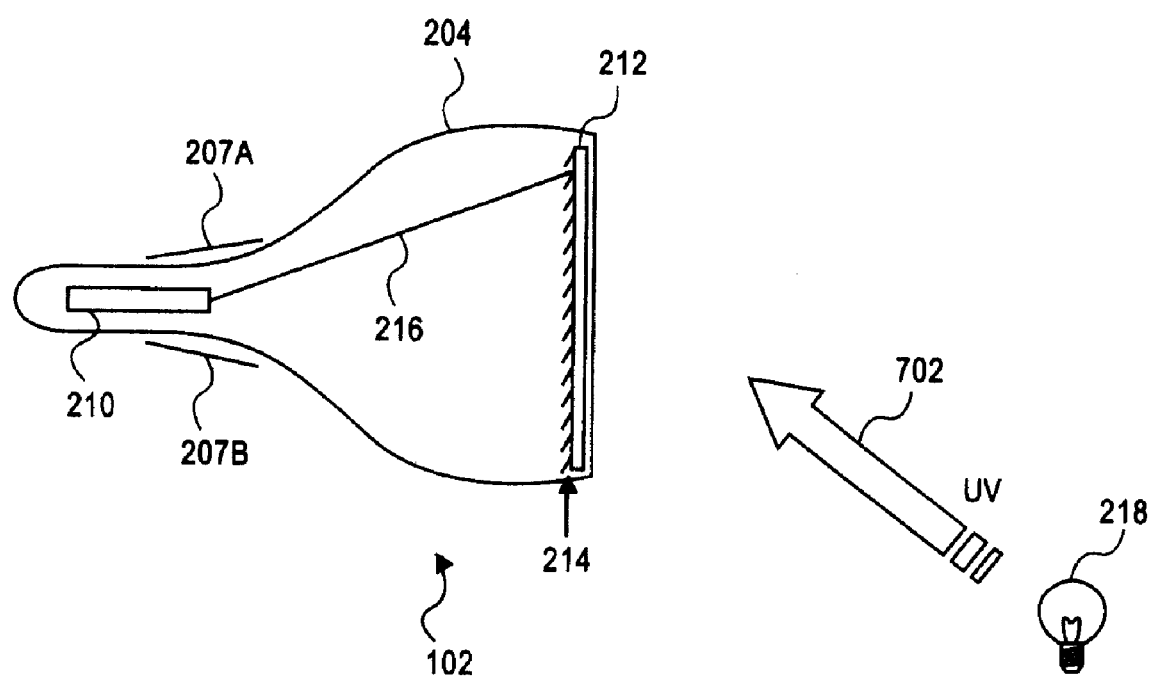
FIG. 7 is a diagram of a display device in which ultraviolet (UV) light is employed to discharge the display elements of the display device via photoelectric effect, according to an embodiment of the invention.

FIG. 7 shows how the display elements 214 may be discharged using ultraviolet (UV) light 702 via the photoelectric effect, according to an embodiment of the invention. FIG. 7 specifically depicts the display device 102 of FIG. 2A, in which there is a cathode-ray tube 204, a focused electron beam source 210 generating a focused electron beam 216, a plate 212, the display elements 214, deflecting plates 207A and 207B, and one or more light sources 218, as before. These components of the display device 102 operate in the same manner as has been described in relation to FIG. 2A, and such operation is not redescribed here to avoid redundancy.

The light sources 218 have been described in relation to FIG. 2A as projecting light against the display elements 214, which is reflected, refracted, or transmitted to result in a displayed image. In the embodiment of FIG. 7, the light sources 218 are also capable of emitting the UV light 702. The UV light 702 may be continuously emitted by the light sources 218, along with the visible light also emitted by the light sources 218 for reflection, refraction, or transmission by the display elements 214 as has been described in relation to FIG. 2A.

In another embodiment, the UV light 702 may be emitted just at certain times. For example, the UV light 702 may be emitted at the end of each frame of display information to be displayed by the display device 102. Thus, the light sources 218 emit visible light during most of each frame, which is reflected, refracted, or transmitted by the display elements 214 as has been described in FIG. 2A, and then at the end of each frame, the UV light 702 is emitted to discharge the display elements 214 to cause the elements 214 to revert to their non-charged positions. One way to accomplish this is to filter the light emitted by the light sources 218 so that the visible light spectrum is passed through during most of each frame, and the UV light 702 is passed through at the end of each frame.

The photoelectric effect causes discharge of the display elements 214 as follows. Photons from the UV light 702 striking the membranes of the display elements 214 dislodge electrons from the membranes previously placed thereon via the electron beam 216. This dislodging of the electrons via photons is the photoelectric effect. These electrons are attracted to the most positive structure, which is typically the plate 212, which itself may be considered the ground plate for discharge purposes using the UV light 702. When sufficient electrons have been dislodged from the membranes of the display elements 214, there is insufficient charge remaining on the membranes to cause them to stay deflected. As a result, the display elements 214 revert to their non-charged positions.

It is noted that if a membrane of a given display element loses sufficient charge that it becomes positively charged, the electrons dislodged via the photoelectric effect will become attracted back to the membrane. The terminology "dislodge" is used herein to indicate that an electron has sufficient energy to escape the surface potential of the membrane. This creates a self potential on the membrane, such that the voltage over the display element relative to the plate 212 is constrained to between zero and an absolute maximum value, where in actuality the voltage ranges from zero and a negative value.

FIG. 7 has been described as having the light sources 218 responsible for both emitting visible light for reflection, refraction, or transmission by the display elements 214, and emitting UV light to discharge the display elements 214. However, in another embodiment the UV light source used to discharge the elements 214 may not be the same light source that emits the visible light for manipulation by the elements 214. That is, there may be two light sources or two sets of light sources: one for emitting visible light resulting in a displayed image, as has been described in relation to FIG. 2A, and one for emitting UV light to discharge the display elements 214 via photoelectric effect. Such a separate UV light source may be positioned within the cathode-ray tube 204, instead of outside the tube 204 as depicted in FIG. 7.

In one embodiment, the UV light may be continuous, and like the resistor described in the previous discharge embodiment, the charge on the display element is continuously discharged therefrom. In another embodiment, the UV light may be pulsed at a higher intensity—for instance, scanning individual rows or other groupings of the display elements at the same time—to erase all of these display elements to remove any residual charge on the elements. Such erasure may be accomplished just before writing to a given row of display elements in one embodiment. In the embodiment where the UV light is pulsed, the discharge or erasure of the display elements can be accomplished selectively, and not continuously.

FIG. 8 shows a method 800 for discharging the charge induced on the display elements 214 after they have been charged, via photoelectric effect, according to an embodiment of the invention. The display elements 214 are scanned with the focused beam source 210 (802), with the electron beam 216 depositing electrons on the display elements 214 to negatively charge them (804). As a result, the display elements 214 deflect (806). The UV light 702 is emitted towards the display elements 214 (808), such that photons from the UV light 702 dislodge the electrons deposited on the display elements 214 and towards the plate 212, via photoelectric effect (810). The electric field between the display elements 214 and the plate 212 directs the electrons dislodged from the display elements 214 to the plate 212, or ground (811). When a sufficient number of the electrons have been dislodged and directed away from the display elements 214, the display elements 214 return or revert to their default, non-charged position (812).

Methods

Figure 9A:
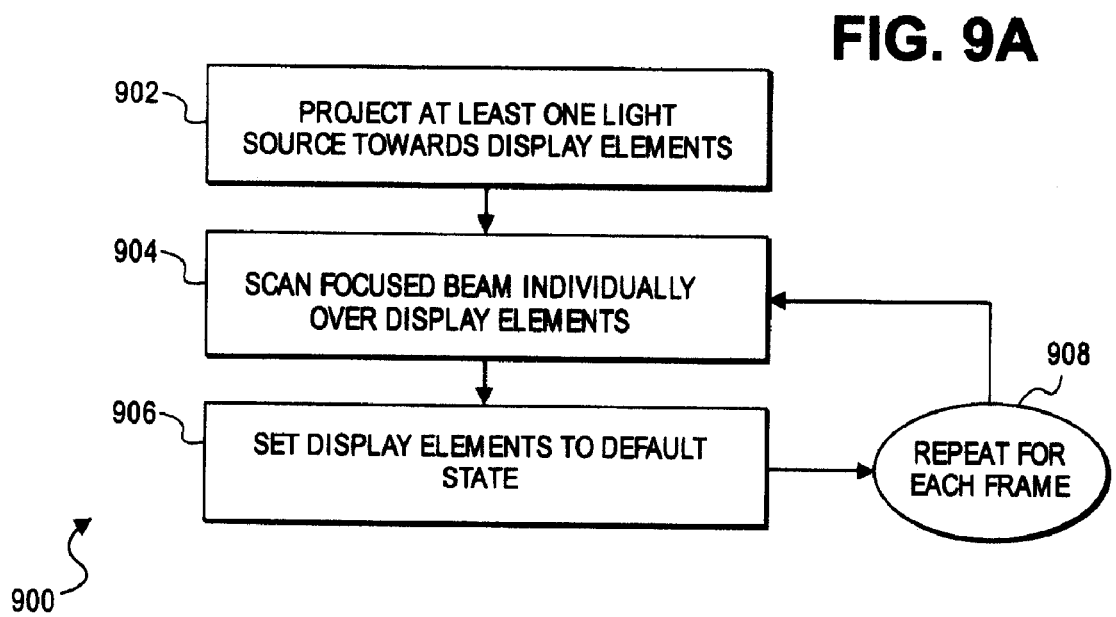
FIGS. 9A and 9B are flowcharts of methods, according to varying embodiments of the invention.

FIG. 9A shows a method of use 900, according to an embodiment of the invention. The method 900 may be performed relative to the projection-type display device 102, of one or more of FIGS. 1, 2A, and 2B, where each of the display elements 214 is implemented as the display element 400 of FIG. 4A or 4C, in one embodiment of the invention. Light 220 from the light sources 218 is projected against the display elements 214 (902). The focused electron beam 216, generated by the focused electron beam source 210, is scanned individually over the display elements 214 (904). The display elements 214 are then reverted to their default states via discharge of the elements 214 (906). Discharge is accomplished by using resistors or an ultraviolet (UV) light source, as has been described above. The scanning process of 904 and the discharge process of 906 are repeated for each frame of the display information (908). For example, the display information may have thirty, sixty, or a different number of frames per second, such that the processes of 904 and 906 are repeated for each of these frames, where each frame may have different color information for each of a number of pixels.

The discharge of the display elements at the end of each frame in 906 of the method 900 may be performed in a number of different ways. A default state may be that state in which a display element is said to reflect no light into a desired direction, such that a maximum darkness shade of gray—i.e., black—is generated. In one embodiment, where the charges stored on the display elements immediately begin to discharge through resistive elements that act as discharge paths, or via constant exposure to continuous UV light, such that, at the end of the frame, the display elements have been substantially completely discharged. In such an embodiment, the display elements have a delay-tilt functionality, in that the elements tilt when sufficient charges are induced on them, and then the elements automatically return to their default states as they are discharged. In one particular case, the display elements tilt to the same position, and remain at that position for a length of time corresponding to the amount of charge induced thereon. The length of time at which the display elements remain tilted can correspond to the degree of grayscale achieved by the elements.

Figure 9B:
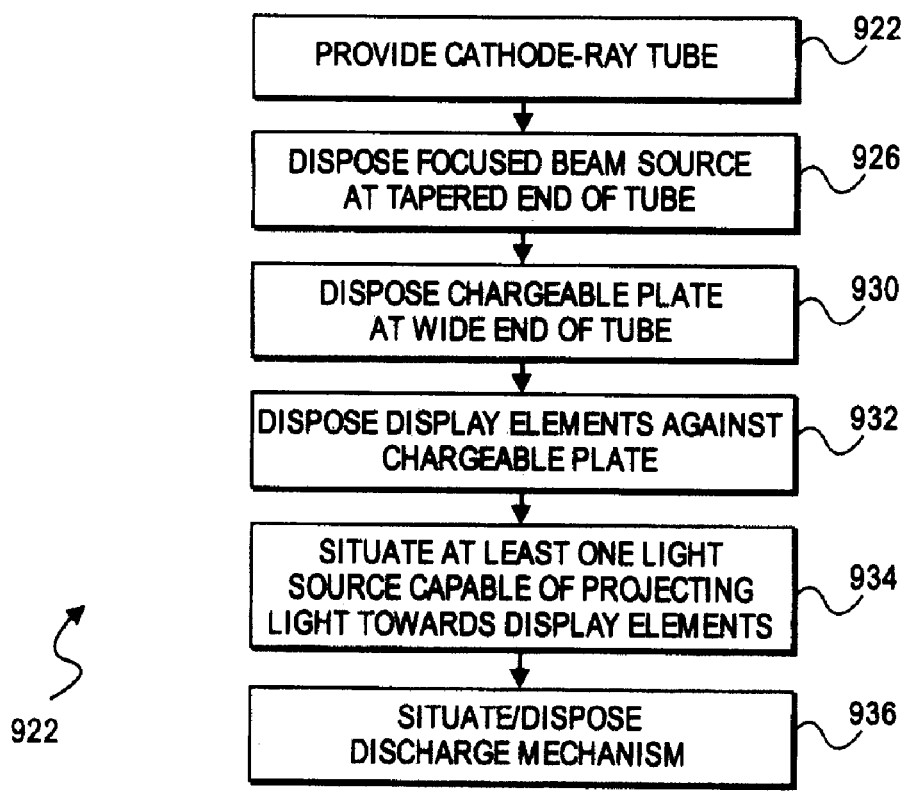

FIG. 9B shows a method 920 for manufacturing a projection-type display device, such as the display device 102 of one or more of FIGS. 1, 2A, and 2B, according to an embodiment of the invention, where the display elements 214 of the device 102 may each be implemented as the display element 400 of FIG. 4A or 4C. The cathode-ray tube 204 is provided (922) that has a wide end 208 tapering down to a tapered end 206 in one embodiment. The focused beam source 210 is disposed at the tapered end 206 of the tube 204 (926) in one embodiment. The plate 212 is disposed at the wide end 208 of the tube 204 (930) in one embodiment, and display elements 214 are disposed against the plate 212 (932). The display elements 214 may each be implemented as the display element 400 of FIG. 4A or 4C. One or more light sources 218 capable of projecting light 220 towards the display elements 214 are situated (934).

Finally, a discharge mechanism may be situated or disposed (936). The discharge mechanism may be situated or disposed by fabricating or otherwise providing a resistor for each display element, as has been described, and which may also include fabricating or otherwise providing an exclusive zone, as has been described. The discharge mechanism may also be situated or disposed by situating a UV light source. The UV light source may be the same as the light sources 218 capable of projecting the light 220 towards the display elements 214, or a different light source.

Alternative and More General Embodiments

Embodiments of the invention have thus far been described in relation to a projection-type display device. However, other embodiments of the invention may be implemented in conjunction with other types of apparatuses and other types of systems. For example, in a general embodiment of the invention, an apparatus may include the micro-electromechanical (MEM) devices that have been described, and a focused beam source. The MEM devices each have states based on the number of secondary electrons emitted therefrom. In the case of a display device, these states correspond to the display states that have been described. The focused beam source generates and scans a focused beam individually over the MEM devices, causing the secondary electrons to be emitted therefrom, such that the MEM devices each enter one of these states. In one specific embodiment of the invention, the apparatus may be employed in the context of a communication-switching network. Each MEM device may correspond to a single communication optic that is switched in accordance with the state of the MEM device. Other applications are also amenable to embodiments of the invention.

The display elements that have been described can therefore be more generally considered light valves in one embodiment of the invention. The light valves may be MEM devices. The light valves may include a support and a reflective membrane, such as a hinged mirror or other mirror-type membrane. The reflective membrane is situated on the support. The reflective membrane is capable of differently reflecting light in accordance with secondary electrons emitted therefrom. In the case of a display device, this light is reflected to form a projected image in accordance with display information. The image may be a black-and-white image, a grayscale image of one color, such as a black, as well as a color image. In other embodiments of the invention, the light may be reflected for other purposes and to perform other functionalities. For instance, in the case of a communication-switching network, the light corresponds to communication optics, each communication optic having a corresponding light valve and switched in accordance with the state of the light valve. Other applications are also amenable to embodiments of the invention.

Furthermore, it is noted that the display elements in at least some embodiments of the invention each have a reflective membrane that tilts to modulate the light incident thereto, instead of, for instance, deforming. That is, the display elements are non-deformable, or tiltable display elements. That the display elements are non-deformable mean that they maintain their shape, and individual components thereof do not bend. For instance, the reflective membrane 406 of FIG. 4A tilts, but maintains its shape while tilting. As another example, the support 404 of FIG. 4C tilts, but maintains its shape while tilting. That is, the shape of the membrane 406 and the support 404 do not deform into a different shape.

Additionally, it is noted that the charge is induced on the display elements via the focused beam generated by the focused beam source. This is as compared to other approaches for causing the display elements to be charged, such as by charging the display elements via a complementary metal-oxide semiconductor (CMOS) circuit, or other type of metal-oxide semiconductor (MOS) circuit, or other type of circuit physically connected thereto.

Therefore, it is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

We claim:

1. An apparatus comprising:
    a plurality of micro-electromechanical (MEM) devices, each MEM device having a plurality of different states based on a charge induced thereon;
    a charge source to induce the charge thereon such that the MEM devices each enter one of the different states thereof; and,
    a discharge mechanism for the MEM devices to discharge the charge induced thereon, the discharge mechanism comprising
    a resistor for each MEM device to discharge the charge on the MEM device to ground including an exclusion zone for the resistor of the MEM device to insulate the resistor and to protect the resistor from electrons emitted by the charge source.

2. The apparatus of claim 1, wherein the charge source is a focused beam source.

3. The apparatus of claim 2, further comprising:
    a cathode-ray tube within which the focused beam source is situated; and, a plate situated within the cathode-ray tube and against which the MEM devices are situated.

4. The apparatus of claim 3, wherein the photons discharge the charge on the MEM devices via the photoelectric effect by dislodging electrons on the MEM devices, such that an electric field between the MEM devices and the plate directs the electrons from the MEM devices and onto the plate.

5. The apparatus of claim 1, further comprising at least one light source to project light towards the plurality of MEM devices, the plurality of MEM devices reflecting the light to result in a displayed image, wherein the UV light source is part of the at least one light source.

6. The apparatus of claim 1, further comprising at least one light source to project light towards the plurality of MEM devices, the plurality of MEM devices reflecting the light to result in a displayed image, wherein the UV light source is a different light source than the at least one light source.

7. The apparatus of claim 1, wherein the MEM devices comprise a plurality of mirror-type MEM devices, each MEM device capable of controlling light intensity reflected thereby based on an angle of reflection of a mirror of the MEM device.

8. The apparatus of claim 7, wherein the mirror of each MEM device is a hinged mirror, the MEM device having a default state in which the hinged mirror is parallel to the plate, such that the charge induced on the MEM device causes the hinged mirror to tilt relative to the plate to enter one of one or more different states other than the default state.

9. The apparatus of claim 8, wherein the hinged mirror of each MEM device is hinged to a support, the resistor of the MEM device connected between the support and ground.

10. The apparatus of claim 9, wherein the support of each MEM device is inserted into a via, the via having a width, a ratio of the width of the via to a width of the resistor being sufficiently large to reduce resistive variation of the resistor.

11. The apparatus of claim 10, wherein the ratio of the width of the via to the width of the resistor is greater than 1.0.

12. The apparatus of claim 1, wherein the resistor of each MEM device has a length sufficiently large to result in a breakdown voltage of the resistor being greater than a maximum voltage drop over the resistor during normal operation.

13. The apparatus of claim 1, wherein the apparatus is at least one of: a display device, a projection-type display device, a direct-view display device, a communication device, an instrumentation device, a light-analysis device, and a light-redirection device.

14. An apparatus comprising:
a plurality of tiltable micro-electromechanical (MEM) devices, each MEM device having a plurality of different states based on a charge induced thereon;
a focused beam source to scan a focused beam individually over the MEM devices to induce the charge thereon such that the MEM devices each enter one of the different states thereof; and,
means for discharging the MEM devices via one of: a resistive path for each MEM device to ground including an exclusion zone for the resistive path of the MEM device to insulate the resistive path and to protect the resistive path from electrons emitted by the focused beam source.

15. The apparatus of claim 14, wherein the means for discharging the MEM devices comprises a resistive mechanism for each MEM device to discharge the charge on the MEM device to ground via the resistive path.

16. An apparatus comprising:
a plurality of tiltable micro-electromechanical (MEM) devices, each MEM device having a plurality of different states based on a charge induced thereon;
a focused beam source to scan a focused beam individually over the MEM devices to induce the charge thereon such that the MEM devices each enter one of the different states thereof; and,
a resistor for each MEM device connecting to the MEM device to ground to discharge the charge induced on the MEM device including, for each MEM device, an exclusion zone for the resistor of the MEM device to insulate the resistor and to protect the resistor from electrons emitted by the focused beam source.

17. The apparatus of claim 16, wherein each MEM device comprises a mirror hinged to a support, the resistor of the MEM device connected between the post and ground.

18. The apparatus of claim 17, wherein the support of each MEM device is inserted into a via, the via having a width, a ratio of the width of the via to a width of the resistor being sufficiently large to reduce resistive variation of the resistor.

19. The apparatus of claim 18, wherein the ratio of the width of the via to the width of the resistor is greater than 1.0.

20. The apparatus of claim 16, wherein the resistor of each MEM device has a length sufficiently large to result in a breakdown voltage of the resistor being greater than a maximum voltage drop over the resistor during normal operation.

21. The apparatus of claim 16, wherein the resistor is fabricated from polysilicon.

22. A method comprising:
projecting at least one light source towards a plurality of micro-electromechanical (MEM) devices to result in a displayed image;
scanning a focused beam individually over the MEM devices to charge the MEM devices in accordance with display information, such that the MEM devices each enter one of more than two display states; and,
discharging the MEM devices via a resistive path and further comprising, for each MEM device, an exclusion zone for the resistive path of the MEM device to insulate the resistive path and to protect the resistive path from electrons emitted by the focused beam source.

23. The method of claim 22, wherein discharging the MEM devices via the resistive path comprises discharging each MEM device through a resistor connecting the MEM device to ground, such that the MEM device returns from a tilted display state to a non-tilted display state.

* * * * *

UNITED STATES PATENT AND TRADEMARK OFFICE
CERTIFICATE OF CORRECTION

PATENT NO.         : 7,535,619 B2  
APPLICATION NO. : 11/831797  
DATED                 : May 19, 2009  
INVENTOR(S)       : Robert W. Shreeve et al.

Page 1 of 1

It is certified that error appears in the above-identified patent and that said Letters Patent is hereby corrected as shown below:

In column 7, line 44, delete "362" and insert -- 352 --, therefor.

Signed and Sealed this

Twenty-ninth Day of September, 2009

David J. Kappos
*Director of the United States Patent and Trademark Office*